United States Patent Office 2,795,631
Patented June 11, 1957

2,795,631

DRYING OILS FROM STEAM-CRACKED PETROLEUM FRACTIONS

Joseph F. Nelson, Fred W. Banes, and Anthony H. Gleason, Westfield, N. J., assignors to Esso Research and Engineering Company, a corporation of Delaware No Drawing. Application July 2, 1954,
Serial No. 441,166

6 Claims. (Cl. 260—669)

This invention relates to a new synthetic all-hydrocarbon drying oil and to a process for preparing the said drying oil by copolymerizing a major proportion of a diolefin such as 1,3-butadiene, with a minor proportion of styrene in the presence of a hydrocarbon diluent, using an alkali metal, particularly sodium, as catalyst. The further presence of certain promoters and modifiers in the reaction mixture is also desirable to obtain a colorless product in the most efficient manner.

The copolymerization of butadiene with styrene in the presence of sodium has been studied experimentally for some years. The use of sodium to catalyze the copolymerization of 1,3-butadiene and styrene was explored and reported in an article by C. S. Marvel, W. J. Bailey and G. E. Inskeep of the University of Illinois in the "Journal of Polymer Science," vol. 1, No. 4 (August 1946), pages 275–288. The influence of the purity of the monomers, the presence of diluents, and the amount of catalyst are studied. The authors found that they were unable to get any sign of polymerization using an ordinary petroleum refinery butadine (98%), even after three weeks at 30° C. (Marvel, p. 278).

Rothrock (Patent No. 2,264,811) prepared viscous drying oils from a mixture of four carbon saturated and unsaturated aliphatic hydrocarbons obtained in petroleum cracking processes and containing butadiene, in the presence of solvents using 4–14% of sodium, at high temperature, but these products did not have as good properties as desired, and as necessary for commercial success. Also, the patent states: "Temperatures below 100° C. produce negligible quantities of drying polymers."

It has now been discovered that the above disadvantages can be overcome and a refinery stream containing butadiene can be used as the feed for the production of a commercially acceptable drying oil provided that the stream is obtained from the steam cracking of petroleum fractions. According to the invention these petroleum fractions may be virgin or catalytically cracked naphthas boiling in the range of 20 to 480° F., gas oils boiling from 400 to 800° F., petrolatums, waxes, petroleum residues, or recycled steam cracked cuts from which diolefins have been removed. These fractions are cracked in the presence of 50–90 mole percent steam at temperatures of about 1000° F. to 1600° F. to give highly unsaturated products. The $C_4$ cut is segregated and used as the butadiene component in the preparation of drying oils.

A typical steam-cracked $C_4$ cut has the following composition in mole percent:

| | |
|---|---|
| Propylene | 0.0 to 5.0 |
| Propane | 0.0 to 1.0 |
| Butadiene 1,3 | 20.0 to 50.0 |
| Butenes | 40.0 to 72.0 |
| Butanes | 1.0 to 35.0 |
| Pentadienes | 0.0 to 0.1 |
| Pentenes | 0.0 to 1.0 |
| Sulfur, p. p. m. | 1 to 15 |
| Acetylene | .04 to 0.2 |
| Propadienes } Butadiene 1,2 } | .02 to 0.2 |

In accordance with the invention, a $C_4$-cut of the above composition is either polymerized alone or mixed with an amount of a styrene equal to not more than 60% preferably 15 to 25%, of the butadiene present in the cut, at a temperature between about 50 and 100° C. The polymerization is carried out in the presence of 1.2 to 8 parts of a finely divided sodium catalyst per 100 parts of butadiene and styrene, preferably 2 to 5 parts. $C_3$ cut may be included as diluent in the polymerization.

Halogen-containing monomers, such as chloroprene or chlorinated styrene are not suited for polymerization with sodium. The replacement of styrene by its ring alkylated homologs, such as paramethyl styrene, meta-methyl styrene, dimethyl styrene and the corresponding ethyl substituted homologs is the only variation of monomers permissible herein. However, styrene is the most practical from the economic standpoint. Alpha methyl styrene is unsuitable because it is too unreactive.

A desirable modification of the process involves the use of a substantial amount of certain ethers as co-diluents or modifiers along with the hydrocarbon diluent. The ethers function in varying ways to control the reaction rate, to improve product color or to control product viscosity. The choice of the particular ether used will depend on the particular type of modification desired. A particular outstanding promoter for the batch process has been found in dioxane-1,4, whose presence in the feed aids in the production of a colorless product of desirable viscosity and good drying properties, and promotes the reaction sufficiently to give 100% conversion at 50° C., in a period of about 5–10 hours. Similarly favorable results were also obtained with diethyl ether $(C_2H_5)_2O$, methylal, ethylal, methyl acetal, and t-butyl methyl ether. In the batch process, diethyl ether is usable, although the initial induction period tends to be somewhat long. However, diethyl ether is the preferred ether in a continuous process as the difficulty in starting up the reaction occurs only at the beginning of the polymerization which runs for a long period of time in contrast to batch runs which have to be started up. Diethyl ether is less subject to undesirable side reactions with metallic sodium, and it is a more vigorous promoter than dioxane. Other ethers useful to a still lesser extent are diethyl acetal, vinyl isobutyl ether, dihydropyrane and ethylal, all of which have a favorable effect on improving the color of the product.

Finally, all cyclic ethers having an —O—C—O— group in a ring structure, such as dioxane-1,3, dioxolane, paraldehyde and glycol ethylidene diacetal, inhibit the polymerization rate so excessively that their use is impractical. Thus the cyclic ethers must have the oxygen atoms separated by at least two carbon atoms.

The ether is used in amounts ranging from about 1 to 100 parts, preferably 5 to 50 parts by wt. per 100 parts of monomers. If a hydrocarbon diluent other than the non-butadiene components of the $C_4$ cut is used it is especially desirable in many cases to select an ether having a boiling point of at least 10° C., below the lower limit of the boiling range of the hydrocarbon diluent, and thus, when using a mineral spirits having a boiling range of 150° C. to 200° C., ether co-diluents boiling between about 25 and 140° C., are preferred for the reason that their separation from the hydrocarbon diluent in the polymerized reaction mixture is greatly facilitated by virtue of the stated difference in boiling points. If the polymer is recovered in about 100% purity, the ether may boil in the range of the added hydrocarbon diluent since both may be recycled together in making up the fresh feed to the reactor.

It is also advantageous to use about 10 to 50%, preferably 10 to 30 weight percent (based on sodium) of an alcohol in the polymerization recipe. Suitable alcohols include isopropanol, isobutanol, isopentanol, secondary butanol, and tertiary butanol. The coarser the catalyst dispersion, the more essential it is to have a sufficient amount of alcohol promoter present.

The reaction time and induction period vary depending on the degree of catalyst dispersion, reaction temperature, moisture content of the system and the sequence of monomer addition.

It is preferred to operate with a catalyst particle size of about 1 to 50, or 10 to 50 microns, such as a mixture ranging from 20 to 40 microns. Such a catalyst can be prepared by dispersing the molten alkali metal in a hydrocarbon such as Varsol by means of a homogenizer such as an Eppenbach-Homo-Mixer and cooling the resulting dispersion below the melting point of sodium to prevent coalescence of the dispersed sodium particles.

The catalyst is usually fed to the reactor as a slurry of metal particles dispersed in 2 to 200 parts by weight of a hydrocarbon liquid. Agitation of the reaction mixture during synthesis increases the efficiency of the catalyst.

It is preferable to initiate the continuous process by first charging the first stage of the reactor and batch reacting the charge until the reaction has reached a relatively high conversion level, for example of about 50 to 80%, and then beginning the continuous or intermittent addition of reactant, solvent, modifiers and catalyst. The reaction is continued in the first stage until the conversion levels off, after which the reactants are passed to the second vessel and additional feed, solvent, modifier and catalyst added if desired. The reaction is continued in this vessel or stage at a higher conversion level than in the first stage. Stages following the first are desirably operated at higher temperatures than the first stage. The reactants are passed to as many subsequent stages as needed to obtain essentially complete conversion. A total of 3 to 6 stages is typical.

Destruction of catalyst at the end of the reaction is effectively accomplished by adding to the reaction mixture a moderate excess of an anhydrous $C_1$ to $C_5$ fatty acid which is soluble in the hydrocarbon mixture, e. g. acetic or pentanoic. After destruction of the catalyst the crude polymerization product containing the salts, excess acid and other impurities is neutralized with ammonia, and the neutralized product is finally filtered preferably with a filter aid such as silica gel, clay, charcoal or its equivalent. Separation can also be accomplished by centrifuging, if desired. Other ways of destroying the catalyst may be used, such as by adding alcohol, or inorganic acids.

The crude product is ordinarily a solution of polymer drying oil in the paraffinic and olefinic constituents of the $C_4$ cut. Depending on the amount and type of ether used, the product is a clear, colorless to light yellow composition having a viscosity of about 0.20 to 20 poises, preferably 0.5 to 10 poises at 50% N. V. M. when dissolved in a hydrocarbon diluent having a specific gravity of about 0.79, such as Varsol. Product of 99% or greater non-volatile content is obtained by stripping of the unreacted $C_4$ hydrocarbons. In the case where an added hydrocarbon diluent is used, more extensive stripping is required to raise the non-volatile content to the level of 99% or higher. In this instance the use of a stripping gas or a mixture of light hydrocarbons is advantageous.

The advantages of the invention will be better understood from a consideration of the following experimental data which are given for the sake of illustration, but without intention of limiting the invention thereto.

*Example 1*

Three hundred grams of a $C_4$ cut (obtained by steam cracking of petroleum fractions) and having the following composition:

| | | |
|---|---|---|
| Propylene | mole percent | 0.8 |
| Propane | do | 0.6 |
| Butadiene-1,3 | do | 26.9 |
| Butenes | do | 69.3 |
| Butanes | mole percent | 2.2 |
| Pentadienes | do | 0.05 |
| Pentenes | do | 0.2 |
| Acetylenes | do | .055 |
| Sulfur, p. p. m | | 10 | were added to 20 grams of styrene (equal to 25% of the butadiene present), 30 grams of dioxane, 2 grams of fine sodium dust (25 microns), and 0.25 gram of isopropyl alcohol. The mixture was heated in a steel pressure bottle for 20 hours at 50° C. At the end of this time a quantity of Varsol equivalent to the combined weight of butadiene and styrene was added and the $C_4$ components and dioxane then removed by distillation. The sodium was then neutralized with 11 g. of glacial acetic acid, the excess of which was neutralized with anhydrous ammonia. The solution was then filtered to remove the sodium and ammonium acetates. The product was a low viscosity oily polymer.

In batch and continuous plant equipment where conditions are subject to better control than in laboratory preparations, for instance moisture can be more rigidly excluded, less sodium catalyst is required to obtain satisfactory polymerization and products without encountering long induction periods. Also, conducting the polymerization at a somewhat higher temperature greatly reduces the induction period and reaction time, even at catalyst concentrations as low as 1.5 percent.

*Example 2*

Example 1 was repeated except that the dioxane was replaced by ethyl ether. A copolymer oil having a viscosity of 3.6 poises at 50% N. V. M. in a hydrocarbon diluent of 0.79 specific gravity was obtained.

*Example 3*

A run similar to Example 1 and using the same feed was carried out in a turbo mixer using 30 parts of dioxane per 100 parts of monomers and 3% sodium. The induction period lasted 4 hours and 100% conversion was reached in five more hours. The product had a viscosity of 0.9 poise at 50% N. V. M. The chemical resistance and flexibility of the baked films were excellent and the unbodied oil appeared to be satisfactory as a coating for cans to replace tin.

*Example 4*

A $C_4$ cut from steam cracking and having the following composition:

| | | |
|---|---|---|
| Butenes | percent | 67.1 |
| Butadiene-1,3 | do | 30.7 |
| Butanes | do | 1.8 |
| Propylene | do | 0.3 |
| Propadiene Methyl acetylene | do | 0.1 |
| Acetylenes (as vinyl) (p. p. m.) | | 1300 |
| Sulfur (p. p. m.) | | 3 | was polymerized in accordance with the following recipe:

| | | |
|---|---|---|
| $C_4$ cut | grams | 4100 |
| Hydrocarbon diluent | do | 500 |
| Sodium | do | 54 |
| Styrene | do | 315 |
| Dioxane | do | 540 |
| Isopropanol | do | 3.2 |
| Temperature | °C | 50 | and the following results were obtained:

| | |
|---|---|
| Duration of run | 10 hrs. |
| Induction period | 1 hr. |
| Conversion | 95% |
| Viscosity of polymer oil | 0.42 poise at 50% NVM. |

Example 5

A C₄ cut from steam cracking having the following composition:

| | |
|---|---|
| Butenes ........................................percent.. | 57 |
| Butadiene-1,3 ................................do.... | 41 |
| Butanes ......................................do.... | 1.5 |
| Propylene ....................................do.... | 0.25 |
| Propadiene ⎱ ..............................do.... | 0.09 |
| Vinyl acetylene ⎰ | |
| Acetylenes (as vinyl) (p. p. m.) ............... | 1100 |
| Sulfur (p. p. m.) ........................... | 2.5 | was polymerized according to the following recipe:

| | |
|---|---|
| C₄ cut ......................................grams.. | 3830 |
| Hydrocarbon diluent ..........................do.... | 500 |
| Sodium ......................................do.... | 45 |
| Styrene .....................................do.... | None |
| Dioxane .....................................do.... | 500 |
| Isopropanol .................................do.... | 3.2 |
| Temperature ................................°C.. | 50 |

After an induction period of one hour, the process proceeded smoothly and an oil having a viscosity of 0.7 poise at 50% NVM was obtained.

Example 6

A C₄ cut from steam cracking having the following composition:

| | |
|---|---|
| Butenes ........................................percent.. | 44 |
| Butadiene-1,3 ................................do.... | 20.2 |
| Butanes ......................................do.... | 34 |
| Propylene ....................................do.... | 0.17 |
| Propadiene ⎱ ..............................do.... | 0.06 |
| Methyl acetylene ⎰ | |
| Acetylenes (as vinyl) (p. p. m.) ............... | 730 |
| Sulfur (p. p. m.) ........................... | 4 | was polymerized according to the following recipe:

| | |
|---|---|
| C₄ cut ......................................grams.. | 5000 |
| Hydrocarbon diluent .......................... | — |
| Sodium ......................................grams.. | 30 |
| Styrene .....................................do.... | 250 |
| Dioxane .....................................do.... | 400 |
| Isopropanol .................................do.... | 3 |
| Temperature ................................°C.. | 50 |

After an induction period of four hours the process proceeded smoothly and an oil having a viscosity of 1.0 poise at 50% NVM was obtained.

The above data show that commercially satisfactory drying oils can be prepared by using the C₄ cut from steam cracked petroleum fractions as the butadiene and diluent used in the polymerization process. The result is surprising in that the allenic and acetylenic compounds of the feed are greater in the C₄ cut than in the usual refinery extracted butadiene (98% purity) since the copper salts used to extract the butadiene tend to polymerize the acetylenes thus removing them as contaminants. This result is particularly surprising since Marvel states that he was unable to obtain any product with ordinary refinery butadiene.

The nature of the present invention having been thus fully set forth and specific examples of the same given, what is claimed as new and useful and desired to be secured by Letters Patent is:

1. Process for preparing a synthetic drying oil which comprises cracking a petroleum fraction in the presence of 50 to 90 mol percent steam at a temperature between about 1000 and 1600° F., segregating a C₄ cut containing between about 20 and 50 mol percent of butadiene-1,3 monomer and about 40 to 72 mol percent butenes, polymerizing said C₄ cut at a temperature between about 50 and 100° C. in the presence of about 1.2 to 5 parts by weight of an alkali metal catalyst per 100 parts by weight of monomer, controlling the polymerization with from about 1 to 100 parts by weight of an ether per 100 parts by weight of monomer, said ether being selected from the group consisting of lower aliphatic ethers and dioxane-1,4 and recovering a colorless drying oil.

2. Process for preparing synthetic drying oil which comprises cracking a petroleum fraction in the presence of 50 to 90 mol percent steam at a temperature between about 1000 and 1600° F., segregating a C₄ cut containing between about 20 and 50 mol percent butadiene-1,3 monomer and about 40 to 70 mol percent butenes, copolymerizing said C₄ cut with 15 to 25 parts of styrene monomer at a temperature between 50 and 100° C. in the presence of about 2 to 5 parts by weight of an alkali metal catalyst per 100 parts of the monomers, controlling the polymerization with from 1 to 100 parts by weight of an ether per 100 parts of the monomers, said ether being selected from the group consisting of lower aliphatic ethers and dioxane-1,4, and recovering a colorless drying oil.

3. Process according to claim 2 in which the C₄-cut has the following approximate composition:

| | |
|---|---|
| Propylene ................................... | 0.0 to 5.0 |
| Propane ..................................... | 0.0 to 1.0 |
| Butadiene 1,3................................ | 20.0 to 50.0 |
| Butenes ..................................... | 40.0 to 72.0 |
| Butanes ..................................... | 1.0 to 35.0 |
| Pentadienes ................................. | 0.0 to 0.1 |
| Pentenes .................................... | 0.0 to 1.0 |
| Sulfur, p. p. m............................... | 1 to 15 |
| Acetylenes .................................. | .04 to 0.2 |
| Propadienes ⎱ ............................ | .02 to 0.2 |
| Butadiene 1,2 ⎰ | |

4. Process according to claim 2 in which the polymerization is carried out in the additional presence of 10 to 50%, based on sodium, of an alcohol.

5. Process according to claim 4 in which the ether is dioxane and the alcohol is isopropanol.

6. Process according to claim 4 in which the ether is diethyl ether and the alcohol is isopropanol.

References Cited in the file of this patent
UNITED STATES PATENTS

| 2,264,811 | Rothrock ................ | Dec. 2, 1941 |
| 2,416,023 | Schulze ................. | Feb. 18, 1947 |
| 2,459,126 | Clifford ................. | Jan. 11, 1949 |
| 2,669,526 | Koenecke et al. .......... | Feb. 16, 1954 |

OTHER REFERENCES

Marvel et al.: "Jour. Polymer Sci.," vol. 1, No. 4 (April 1946), pages 281, 283.